(12) United States Patent
Spelter et al.

(10) Patent No.: US 10,773,190 B2
(45) Date of Patent: Sep. 15, 2020

(54) FUEL FILTER INSERT WITH A PREFILTER AND A MAIN FILTER ELEMENT, AND FUEL FILTER

(71) Applicant: MANN+HUMMEL GmbH, Ludwigsburg (DE)

(72) Inventors: Lars Spelter, Ditzingen (DE); Idriss Razgani, Ludwigsburg (DE); Jonas Eble, Erlenbach (DE); Christoph Baumann, Moeglingen (DE); Christopher Mueller, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 312 days.

(21) Appl. No.: 15/703,064

(22) Filed: Sep. 13, 2017

(65) Prior Publication Data

US 2018/0008918 A1    Jan. 11, 2018

Related U.S. Application Data

(63) Continuation of application No. PCT/EP2016/054853, filed on Mar. 8, 2016.

(30) Foreign Application Priority Data

Mar. 15, 2015   (DE) .................. 10 2015 003 164

(51) Int. Cl.
*B01D 35/26* (2006.01)
*F02M 37/24* (2019.01)
(Continued)

(52) U.S. Cl.
CPC ............. *B01D 35/26* (2013.01); *B01D 29/58* (2013.01); *B01D 36/003* (2013.01);
(Continued)

(58) Field of Classification Search
CPC .. B01D 35/26; B01D 36/003; B01D 2201/46; B01D 2201/40; B01D 2201/34;
(Continued)

(56) References Cited

U.S. PATENT DOCUMENTS 2,098,725 A * 11/1937 Hurn ...................... B01D 35/16
                                                    210/132
3,312,350 A *  4/1967 Kasten ................. B01D 35/005
                                                    210/307

(Continued)

FOREIGN PATENT DOCUMENTS

DE    202006004527 U1   8/2007
DE    102008048228 A1   1/2010
(Continued)

*Primary Examiner* — David C Mellon
(74) *Attorney, Agent, or Firm* — James Hasselbeck

(57) ABSTRACT

A fuel filter insert for a fuel filter has a low-pressure region with prefilter element arranged therein. A high-pressure region arranged fluidically downstream of the low-pressure region has a main filter element arranged therein. Prefilter element and main filter element are arranged one atop the other axially in the fuel filter insert. A wall element projects away from the main filter element in axial direction and extends at least partially through the prefilter element. Low-pressure region and high-pressure region at least over sections thereof are separated from each other by the wall element. A fuel filter is provided with a filter housing in which the fuel filter insert is arranged. The filter housing has a fuel outlet and a fuel inlet for fuel prefiltered by the prefilter element. Fuel inlet and fuel outlet are fluidically positioned between low-pressure region and high-pressure region and a fuel pump is connectable thereto.

19 Claims, 3 Drawing Sheets

(51) Int. Cl.
*B01D 36/00* (2006.01)
*B01D 29/58* (2006.01)

(52) U.S. Cl.
CPC ....... *F02M 37/24* (2019.01); *B01D 2201/295* (2013.01); *B01D 2201/298* (2013.01); *B01D 2201/34* (2013.01); *B01D 2201/40* (2013.01); *B01D 2201/46* (2013.01)

(58) Field of Classification Search
CPC ........ B01D 2201/298; B01D 2201/295; B01D 29/50; B01D 29/56; B01D 29/58; B01D 35/005; B01D 17/04; B01D 17/045; B01D 17/10; B01D 2201/20; B01D 2201/202; B01D 2201/291; B01D 2201/342; B01D 2201/347; B01D 36/001; B01D 29/21; F02M 37/24; F02M 37/44; F02M 37/32; F02M 37/42; F02M 37/22
See application file for complete search history.

(56) References Cited

U.S. PATENT DOCUMENTS

| | | | |
|---|---|---|---|
| 3,390,778 A * | 7/1968 | Uhen | B01D 27/148 |
| | | | 210/314 |
| 3,465,883 A * | 9/1969 | Jumper | B01D 29/58 |
| | | | 210/307 |
| 3,900,400 A | 8/1975 | Whitfield | |
| 5,017,285 A | 5/1991 | Janik et al. | |
| 5,766,468 A | 6/1998 | Brown et al. | |
| 7,285,149 B2 * | 10/2007 | Fornof | B60T 17/004 |
| | | | 123/196 A |
| 2005/0000876 A1 * | 1/2005 | Knight | B01D 29/15 |
| | | | 210/235 |
| 2005/0155585 A1 | 7/2005 | Bradford | |
| 2008/0135469 A1 * | 6/2008 | Fremont | B01D 29/21 |
| | | | 210/234 |
| 2008/0197060 A1 * | 8/2008 | Girondi | B01D 29/114 |
| | | | 210/86 |
| 2009/0211959 A1 | 8/2009 | Clint et al. | |
| 2010/0314303 A1 * | 12/2010 | Reyinger | B01D 29/21 |
| | | | 210/130 |
| 2011/0203982 A1 | 8/2011 | Braunheim | |
| 2017/0106317 A1 * | 4/2017 | Stamey, Jr. | B01D 29/15 |
| 2017/0204821 A1 * | 7/2017 | Willems | B01D 36/003 |

FOREIGN PATENT DOCUMENTS

| | | |
|---|---|---|
| EP | 1260260 A1 | 11/2002 |
| WO | 2006070221 A1 | 7/2006 |
| WO | 2007110049 A1 | 10/2007 |

* cited by examiner

FUEL FILTER INSERT WITH A PREFILTER AND A MAIN FILTER ELEMENT, AND FUEL FILTER

CROSS-REFERENCE TO RELATED APPLICATIONS

This application is a continuation application of international application No. PCT/EP2016/054853 having an international filing date of 8 Mar. 2016 and designating the United States, the international application claiming a priority date of 13 Mar. 2015, based on prior filed German patent applications No. 10 2015 003 164.3, the entire contents of the aforesaid international application and the aforesaid German patent application being incorporated herein by reference.

BACKGROUND OF THE INVENTION

The invention concerns a fuel filter insert with a prefilter element and a main filter element as well as a fuel filter with such a fuel filter insert.

DE 10 2008 048 228 A9 discloses a fuel filter with a fuel filter insert comprising a prefilter element and a main filter element that can be arranged concentrically to the longitudinal axis of the fuel filter or positioned one behind the other in axial direction. The fuel prefiltered by the prefilter element is supplied pressure-loaded to the main filter element by means of a fuel pump arranged outside of the filter housing. A pressure region comprising the prefilter element and a pressure region comprising the main filter element of the fuel filter insert are separated from each other by a filter housing of a complex construction.

U.S. Pat. No. 3,900,400 B discloses a fluid filter with two filter elements that are arranged in the filter housing one atop the other in the direction of the longitudinal axis of the fluid filter and that can be exchanged independent of each other. The interior of the filter housing is separated by an end disc of a lower filter element and by a housing clamping plate, supported on the end disc resiliently by a spring, into two high-pressure regions in which one of the filter elements is arranged, respectively.

EP 0 852 158 A1 discloses a fuel filter with a fuel filter insert with two filter elements that are arranged fluidically connected one behind the other and arranged one atop the other in the direction of the longitudinal axis of the fuel filter insert.

WO 2006/070221 A1 discloses a further fuel filter with a prefilter element and a main filter element which are arranged concentric relative to the longitudinal axis of the fuel filter.

Similar fuel filters are disclosed in DE 20 2006 004 527 U1 and EP 1 485 605 B1.

The known fuel filter inserts are not very compact and can be handled only with difficulty. Moreover, for accommodating them, a filter housing with a complex and therefore expensive constructive configuration is required.

SUMMARY OF THE INVENTION

Object of the invention is therefore to provide a fuel filter insert and a fuel filter with a prefilter element and a main filter element which, while providing a compact configuration, can be handled more simply as a whole and which at the same time make possible a filter housing with a simplified configuration at minimal manufacturing costs.

The object concerning the fuel filter insert is solved by a fuel filter insert comprising a low-pressure region with a prefilter element and a high-pressure region with a main filter element arranged fluidically downstream of the low-pressure region, wherein the prefilter element and the main filter element are arranged one atop the other in an axial direction relative to the longitudinal axis of the fuel filter insert, and wherein the low-pressure region and the high-pressure region of the fuel filter insert at least over sections thereof are separated from each other by a wall element that projects away from the main filter element in axial direction and extends at least partially through the prefilter element.

The fuel filter according to the invention comprises a filter housing and a fuel filter insert arranged therein embodied in accordance with the invention, wherein the filter housing comprises a fuel outlet, preferably laterally arranged, and a fuel inlet, preferably laterally arranged, for the fuel prefiltered by the prefilter element, wherein the fuel inlet and the fuel outlet are fluidically intermediately positioned between the low-pressure region and the high-pressure region and serve for connecting a fuel pump.

Further embodiments of the invention are disclosed in the description as well as in the claims.

The fuel filter insert according to the invention comprises a low-pressure region with a prefilter element and a high-pressure region with a main filter element, fluidically downstream of the low-pressure region, wherein the prefilter element and the main filter element are arranged one atop the other in an axial direction relative to the longitudinal axis of the filter insert. The low-pressure region and the high-pressure region of the filter insert are at least over sections thereof separated from each other by a wall element which is extending from the main filter element in axial direction at least partially through the prefilter element. Preferably, the wall element extends however from the main filter element in axial direction all the way through the prefilter element. The fuel filter insert according to the invention enables an efficient separation of particulate contaminants contained in the fuel due to the filter elements that are fluidically connected in series. In this context, the prefilter element can advantageously be embodied as a coarse filter for filtering coarser particulate contaminants and the main filter element as a fine filter for filtering smaller particulate contaminants from the fuel. In this respect, the filter media of the prefilter element and of the main filter element can differ from each other in particular with respect to their pore size. Due to the arrangement of the two filter elements in accordance with the invention, a simple constructive configuration as well as a particularly simple handling of the fuel filter insert can be enabled in this context. Moreover, the prefilter element and the main filter element can be configured as a modular unit so that the handling of the fuel filter insert during installation in a filter housing or during its exchange is further simplified.

According to an advantageous embodiment of the invention with respect to manufacturing technology aspects, the wall element is attached with one end to an end disk of the main filter element, in particular integrally formed thereon. By the integrally formed embodiment, a fluid-tight and pressure-tight sealing action of the high-pressure region and of the low-pressure region without use of additional sealing elements between the wall element and the main filter element can be ensured.

The end discs of today's fuel filters are comprised in general of plastic material and are produced as injection molded parts. The one-piece configuration of the wall element with the end disc of the main filter element enables therefore a simplified mounting of the fuel filter insert and minimal cost per piece at the same time. Moreover, the wall element embodied as one piece together with the end disc can be embodied with a sufficiently high mechanical loadability for mounting of the fuel filter insert in a filter housing in order to be able to connect it, for example, with its free end section, seal-tightly on housing structures of the filter housing.

According to the invention, a particularly compact and cost-efficient configuration of the fuel filter element can be realized in that between the prefilter element and the main filter element a flow channel for the fuel, prefiltered by the prefilter element, is arranged which is immediately delimited in axial direction by end discs, correlated with each other, of the prefilter element and of the main filter element. A simplified constructive configuration of the fuel filter element as a whole results in this way. Moreover, the fuel filter insert can be manufactured cost-efficiently. Handling of the fuel filter element during installation in a filter housing of a fuel filter or during its exchange can be further simplified in this context. The flow channel is delimited in radial direction inwardly by the wall element.

According to a preferred embodiment of the invention, the end discs of the prefilter element and of the main filter element delimiting the flow channel, in particular as injection molded plastic part, can be connected with each other, for common removal of the main filter element and prefilter element, in particular embodied together as one piece. In this way, the manufacture, mounting, and handling of the fuel filter insert is further simplified. Moreover, the geometry of the flow channel as well as also a reliable positioning of the end discs in the filter housing relative to a fuel outlet of the filter housing can be simplified. According to the invention, the end discs in this context can be connected to each other by one or a plurality of distance elements that are arranged between the two end discs and integrally formed on both end discs. It is understood in this context that the flow channel in radial direction may not be completely blocked by the distance element(s).

According to the invention, the two end discs of the prefilter element and of the main filter element that delimit the flow channel can each comprise moreover a (radial) sealing element for a reliable sealing action of the flow channel relative to a filter housing. The sealing element is comprised advantageously of a (fuel-resistant) elastomer. In this way, manufacturing tolerances of the prefilter element as well as of the main filter element/filter housing or contaminants which are adhering to the inside of the filter housing can be compensated.

Fuels can comprise in practice a relevant water content that can cause damage to or malfunction of high pressure fuel injection systems or diesel engines. According to a preferred embodiment of the invention, the fuel filter insert therefore comprises a water separating unit for separating water contained in the fuel.

According to the invention, the water separating unit can comprise, or at least partially form, a water discharge channel for the water separated from the fuel that extends in axial direction at least partially through the prefilter element. In this context, the water discharge channel can be delimited in radial direction outwardly (immediately) by the wall element.

The water separating unit comprises advantageously a water separating gap which is fluidically connected with one end to the water discharge channel. According to a preferred embodiment of the invention, the water separating gap is arranged between a screen tube and a filter medium of the main filter element. The screen tube serves as final separator for the water contained in the fuel and enables a particularly efficient water separation.

The water separating efficiency of the fuel filter element can be even further improved when the water separating unit comprises a coalescing medium. By means of the coalescing medium, smaller water droplets can be combined to larger water droplets so that they can precipitate more easily due to the force of gravity. For the purpose of a separation efficiency as great as possible, the coalescing medium can be arranged fluidically downstream of a filter medium of the main filter element. The coalescing medium can be configured, as needed, as a single layer or can be multi-layered.

According to the invention, the prefilter element and the main filter element each comprise preferably a filter medium arranged annularly about the longitudinal axis of the fuel filter insert. The filter medium in this context can be preferably flowed through by the fuel in a radial direction relative to the longitudinal axis of the filter insert from the exterior to the interior and is supported inwardly on a grid-shaped support tube in order to prevent a collapse of the filter medium upon flow through the filter medium from the exterior to the interior in radial direction. The filter media in this context can be embodied, respectively, as a filter bellows folded in a star shape.

According to the invention, between the wall element and a lower end disc of the prefilter element that is facing away from the main filter element, an annular receiving slot for receiving a filter housing socket, in particular a water discharge socket of a filter housing, can be formed.

As an alternative to the configuration of a receiving slot, the wall element can be connected seal-tightly to the lower end disc. The sealing action on a housing socket or water discharge socket in this case can be realized e.g. by means of a sealing element which is arranged on the wall element inwardly in radial direction.

The fuel filter according to the invention comprises a filter housing and a fuel filter insert arranged therein, wherein the filter housing comprises a fuel outlet, preferably arranged laterally, and a fuel inlet, preferably arranged laterally, for the fuel prefiltered in the prefilter element. The fuel inlet and the fuel outlet of the filter housing are interconnected fluidically between the low-pressure region and the high-pressure region and serve for connecting a fuel pump.

The fuel filter insert is positioned according to an embodiment of the fuel filter with its two end discs that delimit the flow channel seal-tightly against the inner side of the filter housing, wherein the flow channel is fluidically connected with the fuel outlet.

The filter housing of the fuel filter according to the invention can comprise a fuel discharge channel arranged below the filter insert, wherein, in operating position of the filter insert in the filter housing, a respective raw side of the prefilter element and of the main filter element is sealed by a seal-tight contact of the filter insert on the filter housing relative to the fuel discharge channel and wherein the raw side of the main filter element is fluidically connectable via the raw side of the prefilter element to the fuel discharge channel by an axially oriented movement of the filter insert out of its operating position.

DESCRIPTION OF PREFERRED EMBODIMENTS

Figure 1:
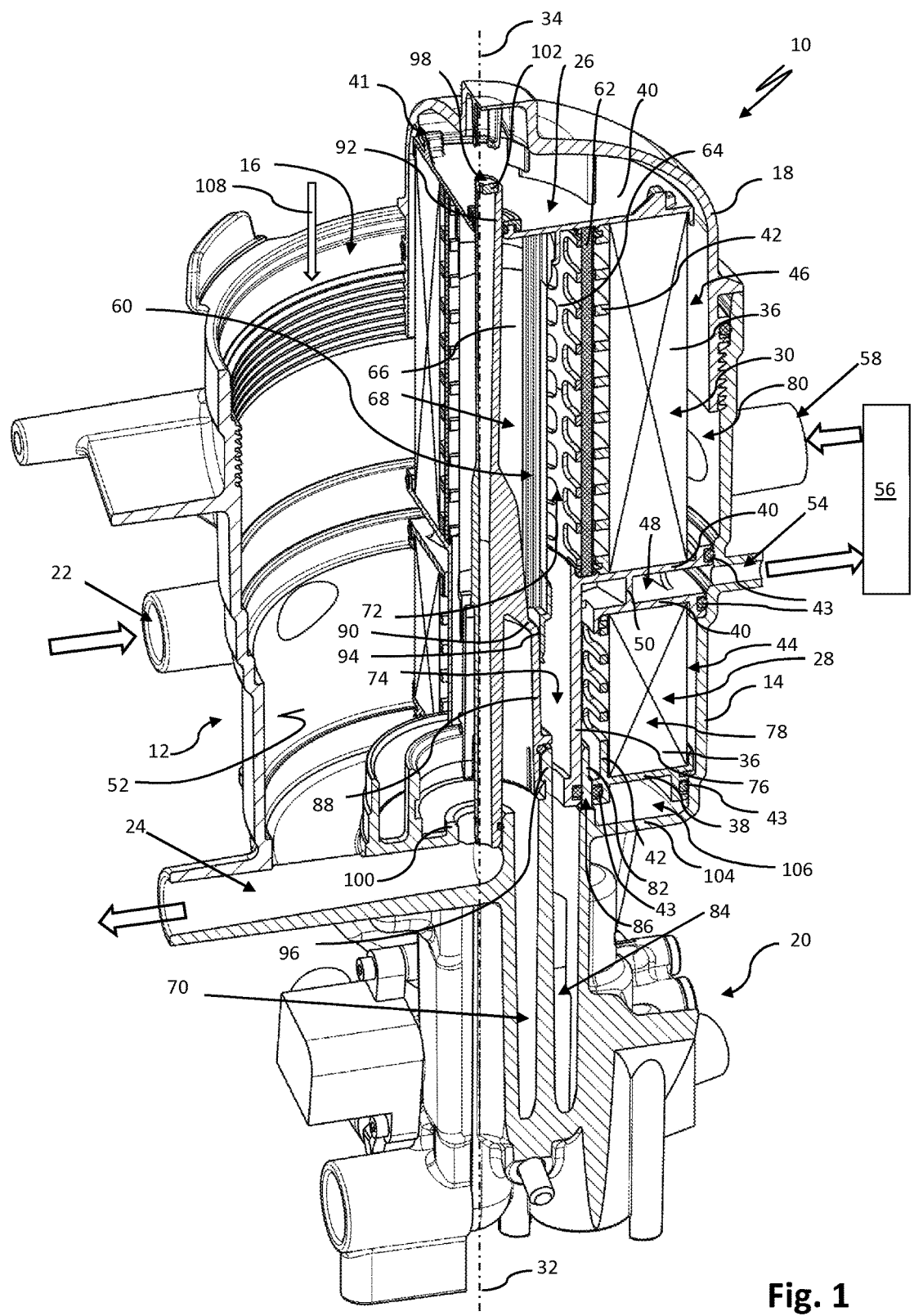
FIG. 1 shows in a perspective section illustration a fuel filter with a filter housing and a filter insert arranged therein and comprising a prefilter element and a main filter element.
Figure 2:
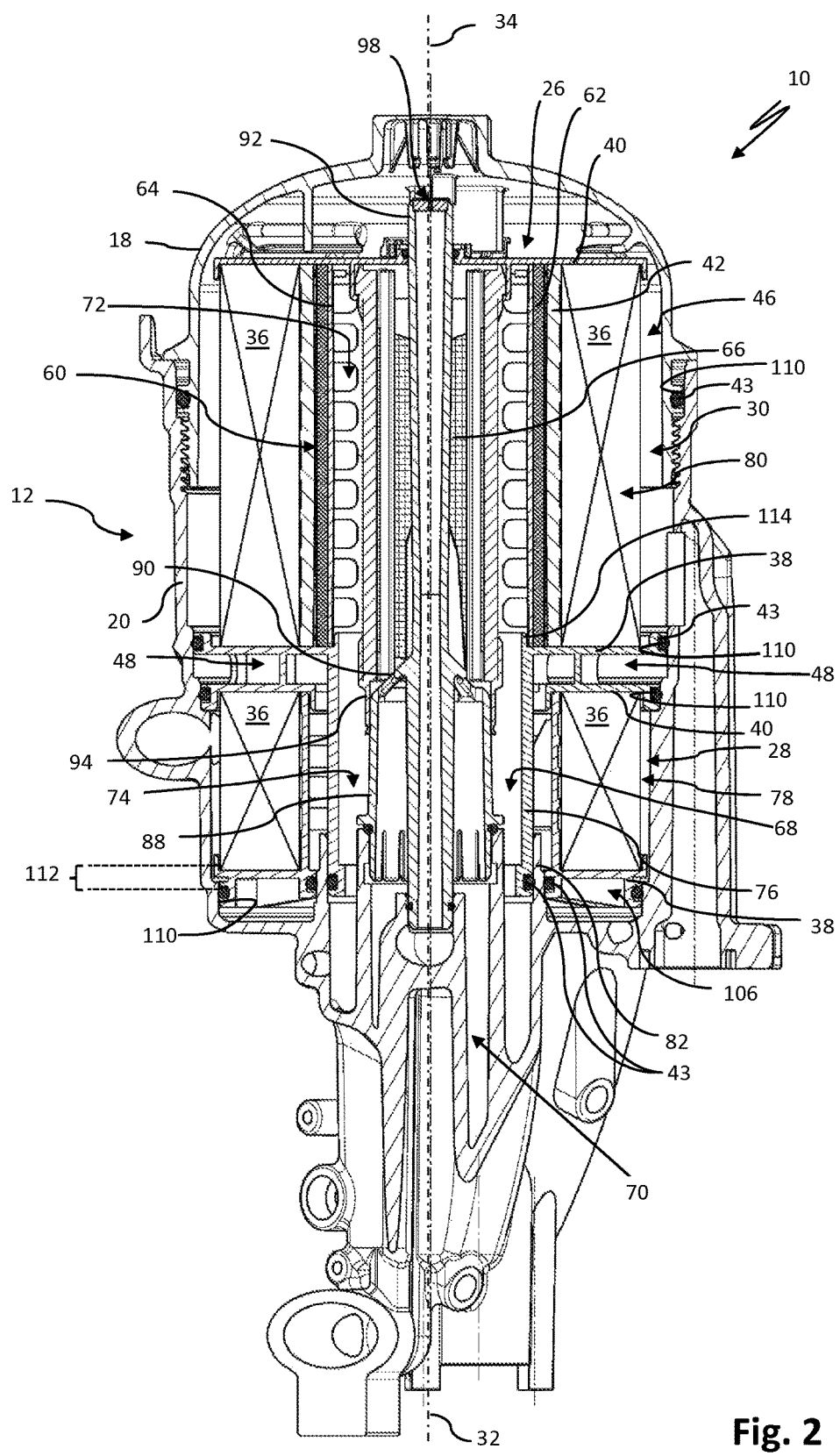
FIG. 2 shows the fuel filter of FIG. 1 in a longitudinal section view.

In the FIGS. 1 and 2, a fuel filter 10 for filtering out contaminants contained in fuel, in particular diesel fuel, is illustrated. The fuel filter 10 is suitable, for example, for use in commercial vehicles with internal combustion engine.

The fuel filter 10 comprises an openable filter housing 12 with a filter cup 14 and with an insertion opening 16 and with a housing cover 18 for closing off the filter cup 14. The filter cover 18 can be screwed into the filter cup 14. A different type of attachment of the filter cover 18 on the filter cup 14 is conceivable. The filter housing 12 can be comprised, for example, of metal or of a plastic material. At the lower end of the filter housing 12, a so-called filter head 20 is formed. The fuel filter 10 is thus designed in a generally known manner for an upright arrangement in operation.

The filter housing 12 comprises a fuel inlet 22 which serves for supplying the fuel to be filtered, for example, from a fuel tank (not illustrated), to the fuel filter 10. A fuel return 24 of the filter housing serves for returning contaminated fuel, e.g., to the aforementioned fuel tank.

In the interior of the filter housing 12, a fuel filter insert 26 is arranged. The fuel filter insert 26 comprises a prefilter element 28 and a main filter element 30. The two filter elements 28, 30 are arranged in the direction of the longitudinal axis 32 of the fuel filter one atop the other in the filter housing 12. The longitudinal axis 32 of the fuel filter coincides with the longitudinal axis 34 of the fuel filter insert 26. The main filter element 30 is fluidically arranged downstream of the prefilter element 28. In other words, in operation the fuel to be filtered flows presently first through the prefilter element 28 arranged at the bottom in the filter housing and subsequently through the main filter element 30 which is arranged above the prefilter element 28.

The prefilter element 28 and the main filter element 30 each are designed as round filter elements with a filter medium 36 which is annularly arranged relative to the longitudinal axis 34 of the fuel filter insert 26. The filter medium 36 of the prefilter element 28 as well as of the main filter element 30 can be flowed through by the fuel to be filtered in a radial direction relative to the longitudinal axis 34 of the fuel filter insert 26 from the exterior to the interior. The filter media 36 each are embodied as a filter bellows folded in a star shape and are secured between a lower and an upper end disc 38, 40 of the respective filter element. The upper end disc 40 of the main filter element 30 can be detachably coupled or is detachably coupled by a bayonet connection 41 (snap connection or something similar) with the housing cover 18. For radial inner support of the filter media 36 of the prefilter element 28 as well as of the main filter element 30, a grid-shaped support tube 42 is provided, respectively. The filter media 36 are resting inwardly on the respective support tube, preferably immediately.

The end discs 38, 40, correlated with each other, of the prefilter element and of the main filter element, i.e., the lower end disc 38 of the main filter element 30 and the upper end disc 40 of the prefilter element 28, are arranged spaced apart from each other in axial direction. These two end discs 38, 40 are resting sealingly (fluid-tightly) by sealing elements 43 against the inner side of the filter housing 12, respectively. The two end discs 38, 40 serve therefore as sealing discs by means of which the interior of the filter housing 12 in axial direction is divided into a prefilter chamber 44 comprising the prefilter element 28 and a main filter chamber 46 comprising the main filter element 30. Between the upper end disc 40 of the prefilter element 28 and the lower end disc 38 of the main filter element 30, a flow channel 48 for the fuel that has been prefiltered by the prefilter element 28 is arranged. The flow channel 48 is immediately delimited in axial direction by the end discs 38, 40, correlated with each other, of the prefilter element 28 and main filter element 30.

The upper end disc 40 of the prefilter element 28 and the lower end disc 38 of the main filter element 30 are connected to each other for common removal of the main filter element 30 and prefilter element 28, in particular are formed together as one piece and can be embodied in particular as injection molded plastic part. As can be seen in FIGS. 1 and 2, between the two end discs 38, 40, distance elements 50 are arranged that are connected to the two end discs, respectively, in particular integrally formed thereon.

The flow channel 48 is substantially embodied in annular configuration and in radial direction is fluidically connected with the inner wall 52 of the filter housing 12. The flow channel 48 at the outlet side is fluidically connected to a laterally (radially) arranged fuel outlet 54 of the filter housing 12. A fuel pump 56 is connectable to the fuel outlet 54. The fuel pump 56 serves to suck the contaminated fuel into the prefilter chamber 44 and through the prefilter element 28 and to pump the prefiltered fuel that has been guided out of the filter housing 12 by means of the fuel inlet 58 of the filter housing 12 into the main filter chamber 46 of the filter housing 12 again. This is done in order to guide the prefiltered fuel through the filter medium 36 of the main filter element 30. The fuel inlet 58 is arranged axially displaced relative to the fuel outlet 54 of the filter housing 12.

The main filter element 30 comprises a water separating unit 60 for separating water contained in the fuel. The water separating unit 60 comprises a coalescing medium 62 that is arranged in an annular shape about the longitudinal axis 34 of the fuel filter insert 26. The coalescing medium 62, as shown in FIGS. 1 and 2, is arranged in particular fluidically downstream of the filter medium 36 of the main filter element 30. In this context, the coalescing medium 36 is resting advantageously inwardly against a central tube 64 so that it does not collapse when loaded with pressure in operation of the fuel filter 10. The central tube 64 is arranged inside the support tube 42 and coaxial to the longitudinal axis 34 of the fuel filter insert 26. The coalescing medium 62 is thus arranged between the central tube 64 and the support tube 42 of the filter medium 36 of the main filter element 30. The coalescing medium 62, as needed, can be embodied as a single layer or multi-layered and can be comprised of a nonwoven, for example.

As can be seen in FIGS. 1 and 2, a screen tube 66 is arranged within the central tube 64. The screen tube 66 serves functionally as a final separator for the water contained in the fuel. The screen tube 66 is arranged so as to extend coaxially relative to the longitudinal axis 34 of the fuel filter insert 26. The interior of the screen tube 66 is fluidically connected by a fuel discharge channel 68 extending in axial direction partially through the prefilter element 28 with a fuel channel 70 of the filter housing 12. The fuel which has been filtered by the prefilter element 28 and main filter element 30 and from which water has been removed at least partially flows in operation from the interior of the screen tube 66 through the fuel discharge channel 68 and the fuel channel 70 of the filter housing 12 in downward direction out of the fuel filter insert 26.

An annular water separating gap 72 is formed between the screen tube 66 and the coalescing medium 62 or the central tube 64. The water separating gap 72 is configured to be open in downward direction and is fluidically connected with one end with a water discharge channel 74 extending lengthwise.

At the lower end disc 38 of the main filter element 30, a substantially tubular wall element 76 is attached, in particular integrally formed thereat, which in axial direction is extending away from the lower end disc 38 of the main filter element 30 in the direction of the filter head 20, i.e., in downward direction. The wall element 76 extends in axial direction to the level of the lower end disc 38 of the prefilter element 28 into the prefilter element. The wall element 76 delimits the prefilter chamber 44 in radial direction on the inner side and separates it relative to the water discharge channel 74 of the fuel filter insert 26. In other words, the water discharge channel 74 for the water separated from the fuel is immediately delimited outwardly in radial direction by the tubular wall element 76.

As a whole, the wall element 76 thus separates from each other a low-pressure region 78, comprising the prefilter element 28, and a high-pressure region 80, comprising the main filter element 30, of the fuel filter insert 26.

The water discharge channel 74 in axial direction can be extending entirely or partially through the prefilter element 28 and is fluidically connected by a housing socket or water discharge socket 82 of the filter housing 12 with a water discharge channel or water collecting chamber 84 of the filter housing 12.

The tubular wall element 76 and the lower end disc 38 of the prefilter element 28 delimit together a receiving slot 86 into which the housing socket or water discharge socket 82 is projecting seal-tightly in axial direction. The wall element 76 is resting seal-tightly by a sealing element 43 on an inner side of the water discharge socket 82 and the lower end disc 38 of the prefilter element 28 by a further sealing element 43 on the exterior side of the water discharge socket 82. In this way, the low-pressure region or the prefilter chamber 44 is sealed relative to the high-pressure region or the water discharge channel 74.

In radial direction, the water discharge channel 74 is delimited on the inner side by a tubular element 88. The tubular element 88 forms at the same time a radial outward boundary of the fuel discharge channel 68. One end of the tubular element 88 is integrally formed on a centrally arranged venting tube 92 of the fuel filter 10 by means of a connecting section 90 that is extending at a slant relative to the longitudinal axis of the fuel filter insert 34 and is fenestrated (not illustrated). Alternatively, the tubular element 88 can also be formed as a part of the screen tube 66 of the fuel filter insert 26.

A free end section of the screen tube 66 is formed as a sealing lip or as a sealing collar 94 and is resting seal-tightly on the exterior of the tubular element 88 about the entire circumference. The tubular element 88 of the venting tube 92 with the other end, i.e., its lower end, is locked (or screw-connected) with a fuel discharge socket 96 of the filter housing 12 and is resting on the inner side seal-tightly against it by means of a sealing element 43.

The venting tube 92 serves for venting the main filter element 30 or the main filter chamber 46 and extends coaxially to the longitudinal axis 34 of the fuel filter insert through the latter. The venting tube 92 with its inlet opening 98 at one end can axially project past the upper end disc 40 of the main filter element 30. The inlet opening 98 of the venting tube 92 in this case is arranged between the upper end disc 40 of the main filter element 30 and the housing cover 18. It is understood that the venting tube 92 can also be arranged flush or substantially flush with the upper end disc 40 of the main filter element 30. The venting tube 92 projects seal-tightly with the other end into a venting socket 100 of the filter housing 12. The venting socket 100 can be fluidically connected with the fuel return 24 of the filter housing 12. In operation of the fuel filter 10, in the region of the main filter chamber 46 air that is contained in the fuel or degassed substances of the fuel can be evacuated in this way by means of the venting tube 92 and the fuel return 24 of the filter housing 12 out of the filter housing 12. For safety reasons, the venting tube 92 can be provided with a throttle 102, for example, in the region of its inlet opening 98.

The prefilter chamber 44 is delimited in downward direction by a housing bottom 104 of the filter housing 12. In its illustrated mounted state, the prefilter element 28 is arranged axially spaced apart from the housing bottom 104. In this way, between the lower end disc 38 of the prefilter element 28 and the housing bottom 104 a fuel discharge channel 106 is formed or defined. The fuel discharge channel 106 surrounds the longitudinal axis 34 of the fuel filter housing 12 and is open toward the fuel return 24 of the filter housing 12, i.e., is fluidically connected therewith.

The filter cup 14 comprises an inner cross section which is tapering axially in the direction toward the housing bottom 104, i.e., in the insertion direction 108 of the fuel filter insert, in a step-wise manner. In this way, the filter housing 12 includes sealing surface sections 110 in the region of its inner wall 52 for the seal-tight contact of the end discs 38, 40 of the fuel filter insert; the sealing surface sections 110 are spaced less far relative to the longitudinal axis 34 of the fuel filter element 26 with increasing spacing from the insertion opening 16 of the filter housing 12 in the direction of the housing bottom 104. In a manner correspondingly therewith, the sealing elements 43 of the lower end disc 38 of the main filter element 30 as well as of the two end discs 38, 40 of the prefilter element 28 are differently spaced apart from the longitudinal axis 34 of the fuel filter insert 26 and are resting seal-tightly against the sealing surface sections 110 of the filter cup 14 in the illustrated operating position of the fuel filter insert 26 in the filter housing 12. In this way, the fuel filter insert 26 can be inserted in a simplified manner and without unnecessary overstressing of its sealing elements 43 into its operating position in the filter housing.

For an exchange of the fuel filter insert 26, the latter is moved axially out of the filter cup 14 opposite to the insertion direction 108. As soon as the fuel filter insert 26 has been moved by an axial travel stroke 112 (see FIG. 2) from its illustrated installed position into a drainage position, the sealing elements 43 of the lower and the upper end discs 38, 40 of the prefilter element 28 as well as of the lower end disc 38 of the main filter element 30 are removed from their respective sealing position on the filter housing 12 or the water discharge socket 82. Accordingly, the main filter chamber 46 is fluidically connected via the prefilter chamber 44 with the fuel discharge channel 106. In this way, the raw-side fuel can flow from the main filter chamber 46 through the prefilter chamber 44, together with the raw-side fuel contained therein, into the fuel discharge channel 106, following the force of gravity. Through the fuel discharge channel 106, the fuel can flow to the fuel return 24.

It should be noted that the axial length of the housing-associated water discharge socket 82 is dimensioned such that the sealing element 43 of the wall element 76 in the drainage position of the fuel filter insert 26 is still seal-tightly contacting the water discharge socket 82. In this way, it is ensured that the fuel from the prefilter chamber 44 does not reach the clean side of the fuel filter 10, here the water discharge (socket) or the fuel discharge socket 96 of the fuel channel 70.

Figure 3:
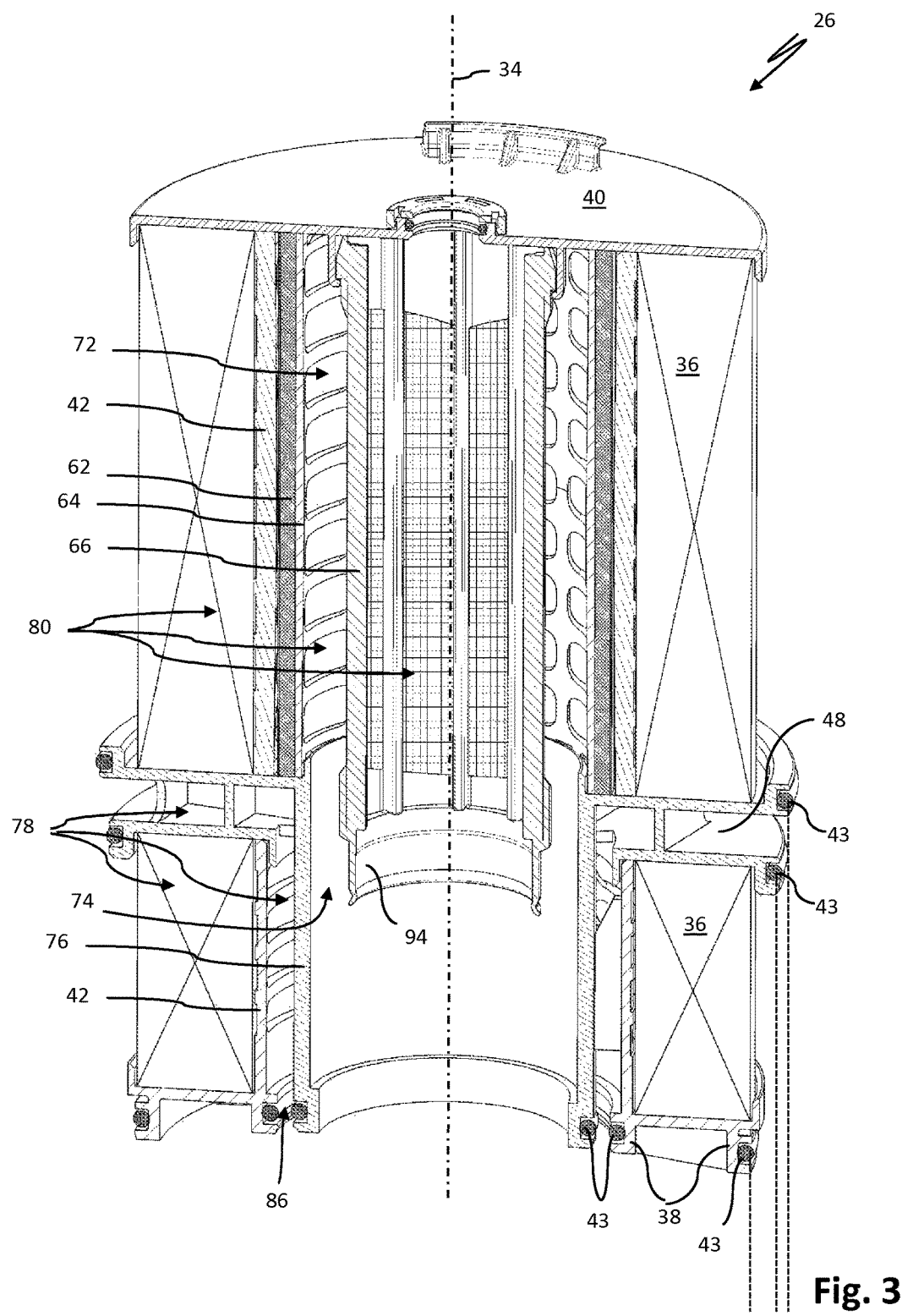
FIG. 3 shows the filter insert of FIG. 1 in an exposed section illustration.

FIG. 3 shows the fuel filter insert of FIGS. 1 and 2 in an exposed illustration and in a longitudinal section. The grid structure of the screen tube 66 can be seen clearly in this illustration. The screen tube 66 is connected, e.g., locked, with the upper end disc 40 of the main filter element 30. The sealing collar 94 of the screen tube 66 can be comprised of an elastically deformable (plastic) material. The sealing collar 94 can thus be pushed seal-tightly onto the tubular element 88 upon axially oriented introduction of the fuel filter insert 26 into the filter housing 12 (FIGS. 1 and 2) by being guided on the slantedly extending connecting section 90 of the venting tube 92. The lower end disc 38 of the main filter element 30 comprises at the inner circumference a holding stay 114. The holding stay 114 is axially projecting away from the lower end disc 38 in the direction of the upper end disc 40 of the main filter element 30 and supports the central tube 64 on the inner side.

In operation of the fuel filter 10, the unfiltered fuel that is sucked in by the fuel pump flows through the fuel inlet 22 of the filter housing into the prefilter chamber 44 and passes through the filter medium 36 of the prefilter element 28 in radial direction from the exterior to the interior. Due to the tubular wall element 76 of the main filter element 30, the fuel flows via the flow channel 48 and the lateral fuel outlet 54 of the filter housing 12 into the fuel pump 56. By means of the fuel pump 56 which is fluidically interconnected between the fuel outlet 54 and the fuel inlet 58, the prefiltered fuel is pumped into the main filter chamber 46 of the filter housing 12. The prefiltered fuel flows through the filter medium 36 of the main filter element 30, the coalescing medium 62, and the screen tube 66 in a radial direction relative to the longitudinal axis 34 of the fuel filter insert 26 from the exterior to the interior. In doing so, the water contained in the fuel is at least partially separated from the fuel and flows, following the force of gravity, from the water separating gap 72 through the water discharge channel 74 in downward direction into the water collecting chamber 84 of the filter housing 12. The fuel, from which contaminants have been removed in this way, flows through the fuel channel 70 out of the fuel filter 10 and can be supplied to an internal combustion engine or a fuel injection pump.

For exchange of the fuel filter insert 26, in a first step the housing cover 18 is removed from the filter cup 14. The bayonet connection 41 between the housing cover 18 and the fuel filter insert 26 is closed or becomes closed due to the screwing movement of the housing cover 18. The fuel filter insert 26 as a whole is moved due to the screwing movement axially in the direction of the longitudinal axis 32 of the filter housing 12 out of its installation position (FIGS. 1 and 2). As soon as the fuel filter insert 26 is in the drainage position, the raw-side (prefiltered) fuel flows out of the main filter chamber 46 of the filter housing 12 into the prefilter chamber 44 and together with the raw-side fuel located therein flows via the fuel discharge channel 106 into the fuel return 24 as well as, as the case may be, into a fuel tank fluidically connected therewith. Upon further unscrewing or lifting off of the housing cover 18 from the filter cup 14 together with the fuel filter insert 26, the inner sealing element 43 of the wall element 76 as well as the sealing element 43 of the lower end disc 38 of the prefilter element 28 which is contacting the water discharge socket 82 are moved out of their seal-tight contact at the water discharge socket 82. A possibly present liquid level of a fuel water mixture at the clean side can then flow in radial direction outwardly into the fuel discharge channel 106 and can flow out of the filter housing 12 via the fuel return 24. After complete removal of the fuel filter insert 26 from the filter cup 14, it is decoupled from the housing cover 18 and a new fuel filter insert 26 is fastened to the housing cover 18. The fuel filter insert 26 is inserted subsequently in the insertion direction into the filter cup 14 and, by screwing the housing cover 18 onto the filter cup 14, is transferred into its installation position (FIGS. 1 and 2).

What is claimed is:

1. A fuel filter insert for a fuel filter, the fuel filter insert comprising:
    a low-pressure region of the fuel filter insert;
    a high-pressure region of the fuel filter insert, wherein the low-pressure region is separated from the high-pressure region and spaced apart axially atop the low-pressure region,
    wherein the high-pressure region is arranged fluidically downstream of the low-pressure region;
    a prefilter element arranged in the low-pressure region;
    a main filter element arranged in the high-pressure region,
    wherein the main filter element is arranged ene atop of the prefilter element in an axial direction relative to a longitudinal axis of the fuel filter insert;
    wherein the main filter element has a lower end disc facing the prefilter element;
    a tubular wall element formed on the lower end disc of the main filter element and projecting away from the main filter element in the axial direction and axially through the prefilter element and through a central opening of a lower end disc of the prefilter element, wherein the low-pressure region and the high-pressure region are separated from each other by the tubular wall element and the lower end disc of the main filter element;
    a flow channel for fuel prefiltered by the prefilter element that is arranged between the prefilter element and the main filter element;
    wherein the flow channel is delimited in the axial direction immediately by an end disc of the prefilter element that is facing the main filter element and by the lower end disc of the main filter element that is facing the prefilter element.

2. The fuel filter insert according to claim 1, wherein the wall element is integrally formed on the lower end disc of the main filter element.

3. The fuel filter insert according to claim 1, wherein the end disc of the prefilter element that is facing the main filter element and the lower end disc of the main filter element that is facing the prefilter element are connected to each other for common removal of the main filter element and of the prefilter element from a filter housing.

4. The fuel filter insert according to claim 3, wherein the end disc of the prefilter element that is facing the main filter element and the lower end disc of the main filter element are formed together as one piece.

5. The fuel filter insert according to claim 4, wherein the end disc of the prefilter element that is facing the main filter element and the lower end disc of the main filter element are formed as an injection molded plastic part.

6. The fuel filter insert according to claim 1, wherein the main filter element comprises
    a water separating unit configured to separate water contained in fuel to be filtered.

7. The fuel filter insert according to claim 6, wherein the water separating unit comprises
   a water discharge channel configured to discharge water separated from the fuel,
   wherein the water discharge channel extends in the axial direction at least partially through the prefilter element.

8. The fuel filter insert according to claim 7, wherein the water discharge channel is delimited by the tubular wall element in a radial direction relative to the longitudinal axis outwardly.

9. The fuel filter insert according to claim 7, wherein the water separating unit comprises
   a water separating gap comprising an end connected fluidically with the water discharge channel.

10. The fuel filter insert according to claim 9, wherein the main filter element comprises
    a screen tube and
    a filter medium,
    wherein the water separating gap is formed between the screen tube and the filter medium.

11. The fuel filter insert according to claim 10, wherein the water separating unit comprises
    a coalescing medium that is arranged fluidically downstream of the filter medium of the main filter element.

12. The fuel filter insert according to claim 6, wherein the water separating unit comprises
    a coalescing medium.

13. The fuel filter insert according to claim 1, wherein the prefilter element and the main filter element each comprise
    a filter medium configured to be flowed through by a fuel to be filtered in a radial direction relative to the longitudinal axis from an exterior to an interior of the fuel filter insert.

14. The fuel filter insert according to claim 1, further comprising
    an annular receiving slot for receiving a filter housing socket,
    wherein the annular receiving slot is formed between the tubular wall element and the lower end disc of the prefilter element that is facing away from the main filter element.

15. The fuel filter insert according to claim 14, wherein the filter housing socket is a water discharge socket.

16. A fuel filter comprising:
    a filter housing;
    a fuel filter insert arranged in the fuel filter housing, the fuel filter insert comprising
        a low-pressure region of the fuel filter insert;
        a high-pressure region of the fuel filter insert, wherein the low-pressure region is separated from the high-pressure region and spaced apart axially atop the low-pressure region,
        wherein the high-pressure region is arranged fluidically downstream of the low-pressure region;
        a prefilter element arranged in the low-pressure region;
        a main filter element arranged in the high-pressure region,
        wherein the main filter element is arranged atop of the prefilter element in an axial direction relative to a longitudinal axis of the fuel filter insert; and
        wherein the main filter element has a lower end disc facing the prefilter element;
        a tubular wall element formed on the lower end disc of the main filter element and projecting away from the main filter element in the axial direction and extending axially through the prefilter element and through a central opening of a lower end disc of the prefilter element, wherein the low-pressure region and the high-pressure region are separated from each other by the tubular wall element and the lower end disc of the main filter element;
    wherein the filter housing comprises a fuel outlet and a fuel inlet for a fuel prefiltered by the prefilter element,
    wherein the fuel inlet and the fuel outlet are fluidically intermediately positioned between the low-pressure region, the fuel outlet and the fuel inlet are configured to connect a fuel pump thereto.

17. The fuel filter according to claim 16, wherein the fuel outlet is laterally arranged at the filter housing and wherein the fuel inlet is laterally arranged at the filter housing.

18. The fuel filter according to claim 16, wherein the fuel filter insert further comprises
    a flow channel for the fuel prefiltered by the prefilter element,
    wherein the flow channel is arranged between the prefilter element and the main filter element,
    wherein the flow channel is delimited in the axial direction immediately by an end disc of the prefilter element that is facing the main filter element and by the lower end disc of the main filter element that is facing the prefilter element,
    wherein said end disc of the prefilter element that is facing the main filter element and said lower end disc of the main filter element that is facing the prefilter element are contacting seal-tightly an inner side of the filter housing,
    wherein the flow channel is fluidically connected with the fuel outlet of the filter housing.

19. The fuel filter according to claim 16, wherein the filter housing comprises
    a fuel discharge channel arranged below the fuel filter insert,
    wherein, in an operating position of the fuel filter insert in the filter housing, a raw side of the prefilter element and a raw side of the main filter element are seal-tightly separated relative to the fuel discharge channel by a seal-tight contact of the fuel filter insert on the filter housing, and
    wherein the raw side of the main filter element is fluidically connectable via the raw side of the prefilter element with the fuel discharge channel by axially moving the fuel filter insert out of the operating position.

\* \* \* \* \*